(12) United States Patent
Xiao

(10) Patent No.: US 11,140,106 B2
(45) Date of Patent: Oct. 5, 2021

(54) METHOD, DEVICE AND STORAGE MEDIUM FOR INTERACTIVE MESSAGE IN VIDEO PAGE

(71) Applicant: Tencent Technology (Shenzhen) Company Limited, Shenzhen (CN)

(72) Inventor: Rong Xiao, Shenzhen (CN)

(73) Assignee: TENCENT TECHNOLOGY (SHENZHEN) COMPANY LIMITED, Guangdong Province (CN)

( * ) Notice: Subject to any disclaimer, the term of this patent is extended or adjusted under 35 U.S.C. 154(b) by 0 days.

(21) Appl. No.: 16/583,013

(22) Filed: Sep. 25, 2019

(65) Prior Publication Data
US 2020/0021545 A1    Jan. 16, 2020

Related U.S. Application Data

(63) Continuation of application No. PCT/CN2018/098017, filed on Aug. 1, 2018.

(30) Foreign Application Priority Data

Aug. 2, 2017 (CN) .......................... 201710650983.7

(51) Int. Cl.
*H04L 12/58* (2006.01)
*H04L 29/06* (2006.01)

(52) U.S. Cl.
CPC ............ *H04L 51/10* (2013.01); *H04L 51/043* (2013.01); *H04L 51/046* (2013.01); *H04L 65/1069* (2013.01)

(58) Field of Classification Search
CPC ..... H04L 51/10; H04L 51/043; H04L 51/046; H04L 65/1069
See application file for complete search history.

(56) References Cited

U.S. PATENT DOCUMENTS 8,700,714 B1 * 4/2014 Pan .................... H04N 21/4751
                                                    709/206
10,311,362 B1 * 6/2019 Mirza .................... G06F 16/248
(Continued)

FOREIGN PATENT DOCUMENTS

CN    1315113 A    9/2001
CN    101449582 A    6/2009
(Continued)

OTHER PUBLICATIONS

Tencent Technology, WO, PCT/CN2018/098017, Oct. 23, 2018, 4 pgs.

(Continued)

*Primary Examiner* — Azizul Choudhury
(74) *Attorney, Agent, or Firm* — Morgan, Lewis & Bockius LLP

(57) ABSTRACT

A method for message interaction in a video page, a computing device, and a storage medium are provided. The method for implementing message interaction in a video playing page includes: requesting a video interaction system to create a corresponding group when receiving an instruction for creating a group by a first user of the computing device; obtaining an invitation link for joining the group and invoking a social application client; sending a request for associating a first video content selected and the group to the video interaction system, so that the video interaction system associates the first video content with the group according to the request; and presenting, in a playing page of the first video content associated with the group, an interaction message of each member in the group.

18 Claims, 16 Drawing Sheets

(56) References Cited

U.S. PATENT DOCUMENTS

| | | | |
|---|---|---|---|
| 2011/0252340 A1* | 10/2011 | Thomas | G06Q 10/107 715/756 |
| 2014/0029919 A1* | 1/2014 | Codavalli | H04N 7/155 386/278 |
| 2014/0098176 A1* | 4/2014 | Isaacs | H04L 67/20 348/14.01 |
| 2014/0214986 A1* | 7/2014 | Hwang | H04L 51/046 709/206 |
| 2017/0236329 A1* | 8/2017 | Harvey | H04N 21/4828 709/204 |
| 2017/0339081 A1* | 11/2017 | Beust | H04L 51/04 |
| 2017/0353731 A1* | 12/2017 | Wade | G06F 13/4022 |

FOREIGN PATENT DOCUMENTS

| | | |
|---|---|---|
| CN | 104093081 A | 10/2014 |
| CN | 104579708 A | 4/2015 |
| CN | 105898509 A | 8/2016 |
| CN | 106067861 A | 11/2016 |
| KR | 100769024 B1 | 10/2007 |

OTHER PUBLICATIONS

Tencent Technology, IPRP, PCT/CN2018/098017, dated Feb. 4, 2020, 5 pgs.

Tencent Technology, ISR, PCT/CN2018/098017, dated Oct. 23, 2019, 4 pgs.

\* cited by examiner

METHOD, DEVICE AND STORAGE MEDIUM FOR INTERACTIVE MESSAGE IN VIDEO PAGE

CROSS-REFERENCE TO RELATED APPLICATIONS

This application is a continuation application of PCT/CN2018/098017, entitled "METHOD FOR MESSAGE INTERACTION IN VIDEO PAGE, COMPUTING DEVICE, AND STORAGE MEDIUM" filed on Aug. 1, 2018, which claims priority to Chinese Patent Application No. 201710650983.7, entitled "METHOD FOR MESSAGE INTERACTION IN VIDEO PAGE, APPARATUS, AND STORAGE MEDIUM" filed with the China National Intellectual Property Administration on Aug. 2, 2017, all of which are incorporated by reference in their entirety.

FIELD OF THE TECHNOLOGY

This application relates to the field of Internet, and in particular, to a method for message interaction in a video page, a computing device, and a storage medium.

BACKGROUND OF THE DISCLOSURE

Along with development of Internet technologies, more and more users are used to watching video contents in manners such as live broadcast at mobile terminals. When watching live broadcast of a video content, a user tends to chat with an intimate friend about topics relating to the video. Therefore, the user needs to switch between a video page and a third-party instant communication tool frequently.

SUMMARY

According to an aspect of this application, a method for implementing message interaction in a video playing page is performed by a computing device having one or more processors and memory storing programs to be executed by the one or more processors, the method including: requesting a video interaction system to create a corresponding group when receiving an instruction for creating a group by a first user of the computing device; obtaining an invitation link for joining the group and invoking a social application client to send the invitation link to a social application client of a target user selected by the first user, so that the social application client of the target user, when receiving the invitation link, in response to an instruction for joining the group, sends a corresponding joining request to the video interaction system through the invitation link and the video interaction system adds the target user to the group according to the joining request; sending a request for associating a first video content selected and the group to the video interaction system, so that the video interaction system associates the first video content with the group according to the request; and presenting, in a playing page of the first video content associated with the group, an interaction message of each member in the group.

According to an aspect of this application, a method for implementing message interaction in a video playing page, performed by a computing device, includes: requesting, in response to an instruction for creating a group received when a first video content is played, a video interaction system to create a corresponding group and associate the group created with the first video content; obtaining an invitation link for joining the group and invoking a social application client to send the invitation link to a social application client of a target user selected by the first user, so that the social application client of the target user, when receiving the invitation link, in response to an instruction for joining the group, sends a corresponding joining request to the video interaction system through the invitation link and the video interaction system adds the target user to the group according to the joining request; and presenting, in a playing page of the first video content, an interaction message of each member in the group.

According to an aspect of this application, a method for managing a group, performed by a communications server, includes: creating a corresponding group when receiving an instruction for creating a group and associating the group to be created with a first video content, and associating the group with the first video content; and adding, when receiving an instruction for adding a target user to the group, the target user to the group and sending ID information of the first video content associated with the group to a video client of the target user, so that the video client of the target user associates the group with the first video content according to the ID information.

According to an aspect of this application, a video interaction system includes a connection server, a communications server, and a video server. The connection server is configured to instruct, when receiving a group creation request sent by a video client, the communications server to create a group according to the creation request. The connection server is further configured to receive a request for joining the group sent by a social application client and instruct the communications server to add a target user corresponding to the social application client sending the request to the group. The communications server is configured to provide an interaction message of each member in the group to the video client, and when receiving a request for associating a first video content and the group from the video client, associate the first video content with the group according to the request. The video server is configured to provide the first video content to the video client.

According to an aspect of this application, a computing device comprises one or more processors, memory coupled to the one or more processors and a plurality of programs stored in the memory that, when executed by the one or more processors, cause the computing device to perform the aforementioned method for implementing message interaction in a video playing page according to this application.

According to an aspect of this application, a non-volatile storage medium stores one or more programs, the one or more programs including instructions, the instructions, when being executed by a computing device, causing the computing device to perform the aforementioned method for implementing message interaction in a video playing page according to this application.

In the solution for implementing message interaction in a video playing page according to the present disclosure, a chat mechanism (different from the manner for giving barrages and comments in the existing technology) may be established in a video client, and an association between the group and the video content may be established. On the basis of this, in the solution of the present disclosure, in the same page, the play frame of the video content associated with the group may be presented and the group messages may be displayed, to avoid a troublesome operation of switching an interface by a user between a video client and a social application client (for example, a WeChat or QQ client) frequently in the existing technology.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

The technical solutions in the embodiments of this application will be clearly and completely described in the following with reference to the accompanying drawings in the embodiments of this application. It is obvious that the embodiments to be described are only a part, rather than all, of the embodiments of this application. All other embodiments obtained by a person of ordinary skill in the art based on the embodiments of this application without creative efforts shall fall within the protection scope of this application.

Figure 1:
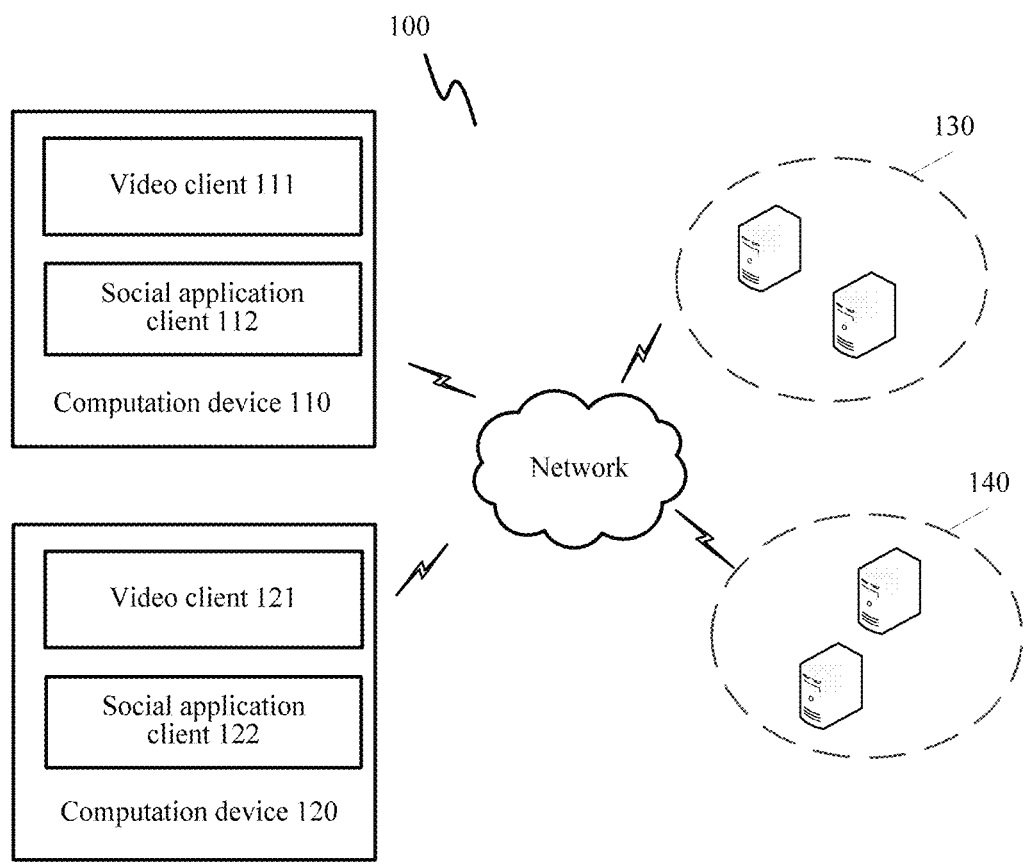
FIG. 1 shows an application scene 100 of a method for implementing message interaction in a video playing page according to some embodiments of this application.

FIG. 1 shows an application scene 100 of a method for implementing message interaction in a video playing page according to some embodiments of this application.

As shown in FIG. 1, the application scene 100 includes a computing device 110, a computing device 120, a video interaction system 130, and a social service system 140. The computing device 110 may include a video client 111 and a social application client 112. The computing device 120 may include a video client 121 and a social application client 122. Herein, the computing device 110 (120) may be implemented as a desktop computer, a tablet computer, a notebook computer, or a mobile phone, but this application is not limited thereto. The video client 111 (121) may communicate with the video interaction system 130, to obtain various types of multimedia information, for example, video contents in a live broadcast mode or an on-demand mode. The video interaction system 130 may include at least one server. The social application client 112 (122) is, for example, a social application such as WeChat or QQ, and may communicate with the social service system 140. The social service system 140 is a server cluster supporting communication of social application clients.

Figure 2:
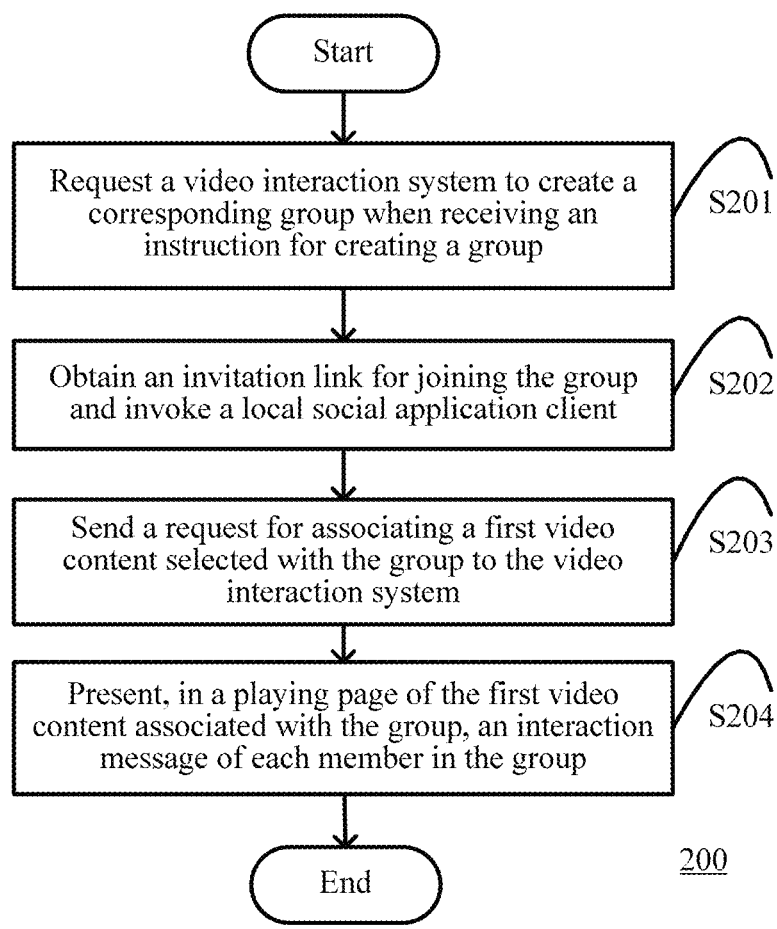
FIG. 2 is a flowchart of a method 200 for implementing message interaction in a video playing page according to some embodiments of this application.

In some embodiments, when watching a video content using a video application, a user not only expresses opinions in a comment window of a video playing page, but also needs to chat with others (such as friends) using a social application. In other words, the user needs to perform window switch between the video application and the social application ceaselessly. Differently, in this application, the video client may establish a group for message interaction between a user that is logged in currently and friend (not strangers), and the play frame of the video content and the interaction message of each member in the group are presented in the same page. It should be especially noted that, the video client may establish association between the group and the video content. For example, in the video client, associated video contents may be played in a message interaction page of the group. Further, for example, associated groups may be opened in the playing page of the video content. Thus, each member in the group may chat about topics relating to a video content in the group while watching the same video content. Certainly, the chat content is not limited to the video content that is watched. Herein, each member in the group may be considered to be in a virtual "box", that is, the group may also be called as a "box". Referring to FIG. 2, the following further describes the method for implementing message interaction in a video playing page according to this application.

FIG. 2 is a flowchart of a method 200 for implementing message interaction in a video playing page according to some embodiments of this application. The method 200, for example, may be performed by the video client (111), but this application is not limited thereto.

As shown in FIG. 2, in step S201, request the video interaction system (130) to create a corresponding group when receiving an instruction for creating a group by a first user of the computing device. In an embodiment, the instruction for creating a group may be, for example, generated by the video client in response to a user operation (such as a click operation).

Figure 3A:
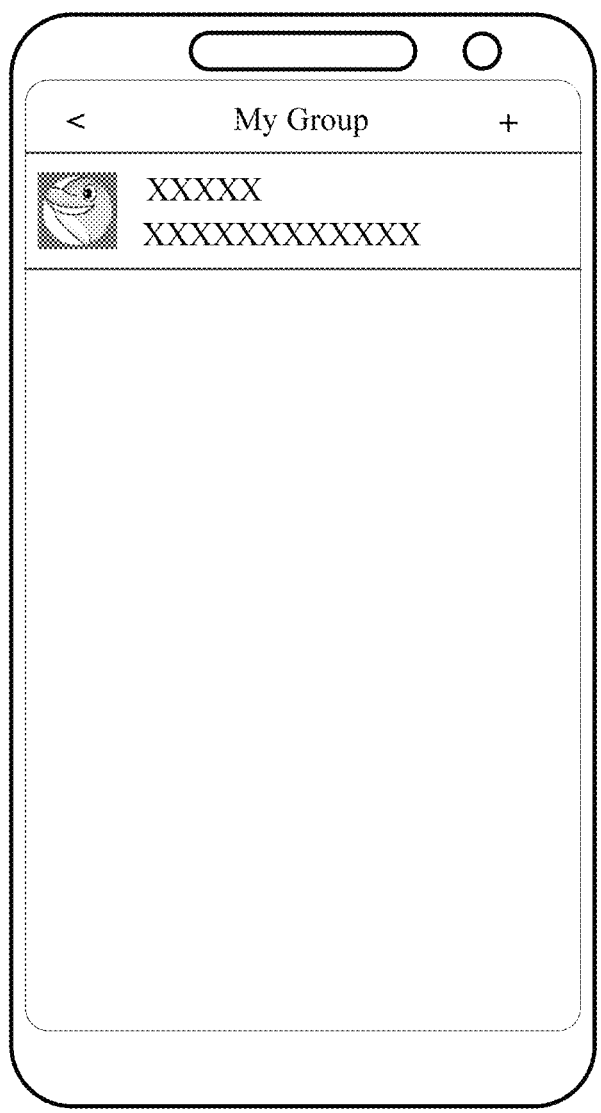
FIG. 3A is a schematic diagram of an interaction interface for creating a group according to an embodiment.

FIG. 3A is a schematic diagram of an interaction interface for creating a group according to an embodiment. When "+" in FIG. 3A is clicked, the video client may generate an instruction for creating a group. On the basis of this, in step S201, a request message (for example, a request in an http format, but this application is not limited thereto) for creating a group may be sent to the video interaction system. Herein, the request message usually includes a user ID of the video client. Herein, the user ID may be referred to as a login account for the video client and may include information such as a user nickname or digital ID. Thus, the video interaction system (130) may establish a group associated with the user ID. In addition, the user ID may also be configured to be consistent with the user ID of the social application client (WeChat or QQ).

To enable friends (that is, target users below) of the user to join the group in step S201, the method 200 may perform step S202. Herein, the so-called "friends of the user" may include users that are in the social relationship chain of the user and have established various social relationships with the user, for example, the friends of the user, other users concerned by the user, other users (that is, fans of the user) concerning the user, and members of a certain group where the user is in. In step S202, obtain an invitation link for joining the group and invoke a local social application client to send the invitation link to a social application client of a target user selected by the first user. On the basis of this, the social application client of the target user, when receiving the invitation link, in response to an instruction for joining the group, sends a corresponding joining request to the video interaction system 130 through the invitation link, so that the video interaction system 130 adds the target user to the group according to the joining request. In an embodiment, in step S202, the invitation link is generated by the video client. The invitation link generated includes a user ID (that is, a login account for a local video client). Thus, the joining request sent by the social application client (the WeChat or QQ client) of the target user may include a user ID from the invitation link, so that the video interaction system adds the target user to the group corresponding to the user ID in the invitation link. It should be additionally noted that, the joining request sent by the social application client of the target user further includes the user ID of the social application client. The video interaction system 130 may directly use the user ID of the social application client as the ID (that is, the ID used by the target user for logging in the video client) of the target user joining the group. Certainly, the video interaction system 130 may also allocate other IDs (such as a digital ID) bound with the user ID of the social application client, and this application is not limited thereto. According steps S201 and S202, the video client can establish a group chat mechanism with other video clients. The group chat mechanism is a message interaction manner of private friends and is different from the manner for giving barrages and comments in the video client. In another embodiment, in step S202, the invitation link may also be obtained by the video client from the video interaction system, and this application is not limited thereto.

Regarding the group in step S201, the method 200 may further perform step S203. In step S203, send a request for associating the first video content selected with the group to the video interaction system 130. Thus, the video interaction system 130 may associate the first video content with the group according to the request. In an embodiment, the first video content is a media content having a pre-arranged playing time, for example, live broadcast or playback of a match. In another embodiment, the first video content may be a media content that may be ordered for broadcasting.

Figure 3B:
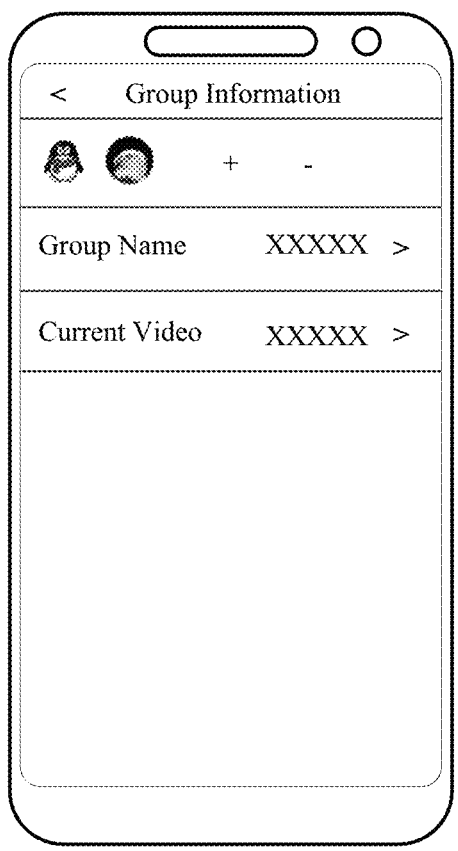
FIG. 3B is a schematic diagram of an interface of a group according to an embodiment of this application.
Figure 3C:
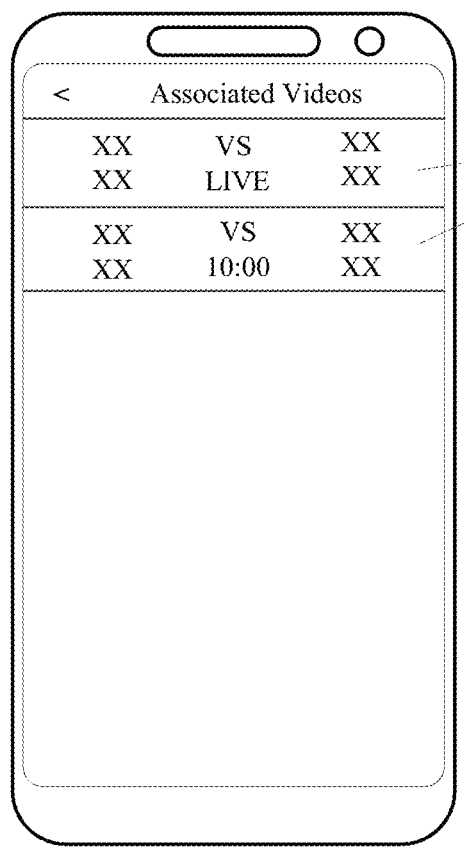
FIG. 3C is a schematic diagram of an interaction interface of determining an associated video of the group in FIG. 3B.

FIG. 3B is a schematic diagram of an interface of a group according to an embodiment of this application. FIG. 3C is a schematic diagram of an interaction interface of determining an associated video of the group in FIG. 3B. When a user clicks an icon ">" in a list box "current videos" in FIG. 3B, the interface skips to the interface shown in FIG. 3C. List items "A" and "B" in FIG. 3C are optional video content items. For example, when the video content item "A" is selected, the video content item "A" is selected as a first video content.

Regarding the associated first video content and group, the method 200 may perform step S204. Present, in a playing page of the first video content associated with the group, an interaction message of each member in the group.

In an embodiment, the first video content is a live broadcast content. When the first video content is in a playing time period, in response to an instruction for opening a group, in step S204, a playing interface of the first video content may be displayed in a chat page of the group. In other words, in step S204, a chat interface of the group may be displayed in the playing page of the first video content. In another embodiment, in step S204, when the first video content is being played, the chat interface of the group may be opened in the playing interface.

Figure 3D:
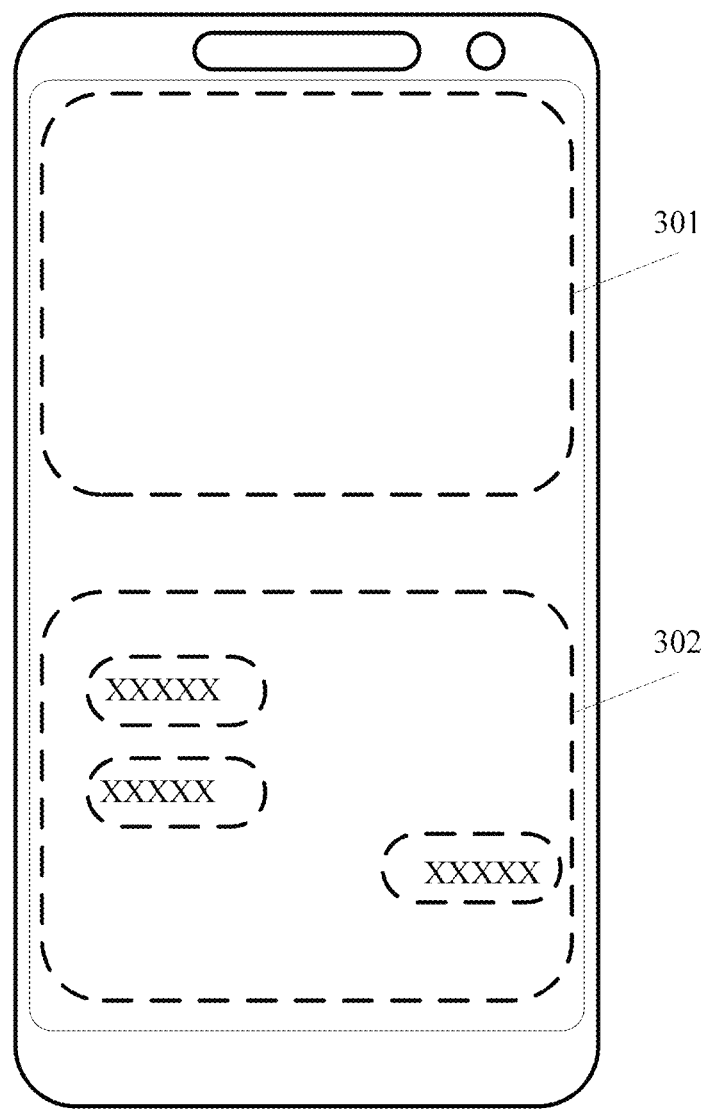
FIGS. 3D and 3E are respectively schematic diagrams of a playing interface according to an embodiment of this application.
Figure 3E:
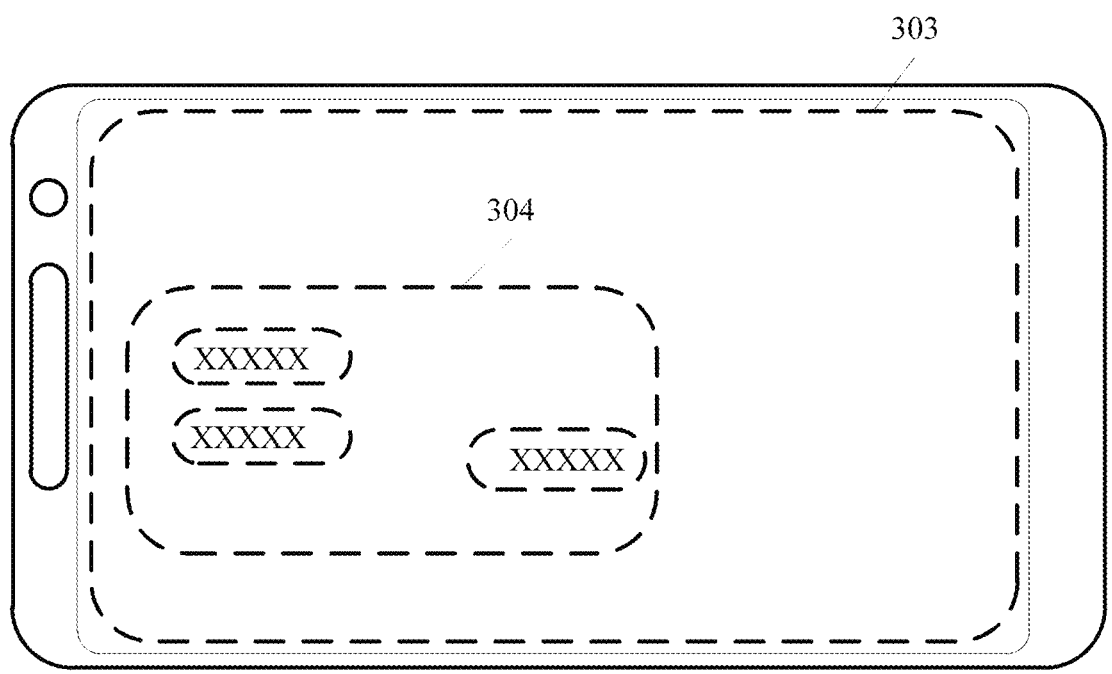

In step S204, more specific manners for playing the first video content and displaying interaction messages of the group in the same page include, but are not limited to, the following manners. On manner is to present a play frame of the first video content in a first region of the playing page and present the interactions message of the group in a second region of the playing page. The other manner is to display an interaction message in a floating manner in a predetermined region of the play frame when the first video content is played in a full screen. FIGS. 3D and 3E are respectively schematic diagrams of a playing interface according to an embodiment of this application. In the interface shown in FIG. 3D, a first region 301 may play a video frame, and a second region 302 may display a chat window of the group. In the interface shown in FIG. 3E, the first video content is played in a full-screen range 303, and interaction of each member in the group is presented in a predetermined region 304.

It should be additionally noted that, the interaction message of each member in the group presented in step S204 is from the video interaction system (130), and have nothing to do with the social application client (112) and the social service system (140). Specifically, in step S204, the chat window (that is, the second region 302 or the predetermined region 304 described above) of the group may be presented. When a first message input by a first member (that is, the user of the local video client) in the group in the chat window is received, the first message is presented in the chat window. In addition, the first message is associated with the first member. On the basis of this, the first message and the first user ID corresponding to the first member are sent to the video interaction system 130. Thus, the video interaction system 130 sends the first message and the first user ID to video clients of other members in the group. When a second message and a second user ID of the group are received from the video interaction system 130, the local video client may present the second message in the chat window and associate the second message with the group member corresponding to the second user ID. In addition, the interaction messages of the members in the group may be text information, emotional graphics, or voice messages, and this application is not limited thereto. In some embodiments, the video client may establish a long session connection with the video interaction system 130, to receive the interaction message of each member in the group from the video interaction system 130 in real time.

Based on the above, the method 200 may establish a group chat mechanism (different from the manner of giving barrages and comments in some embodiments) in the video client and may establish association between the group and the video content. On the basis of this, the method 200 may avoid a troublesome operation of switching an interface by a user between a video client and a social application client (for example, a WeChat or QQ client) frequently and may, in the same page, present a play frame of a video content associated with the group and display group messages.

Figure 4:
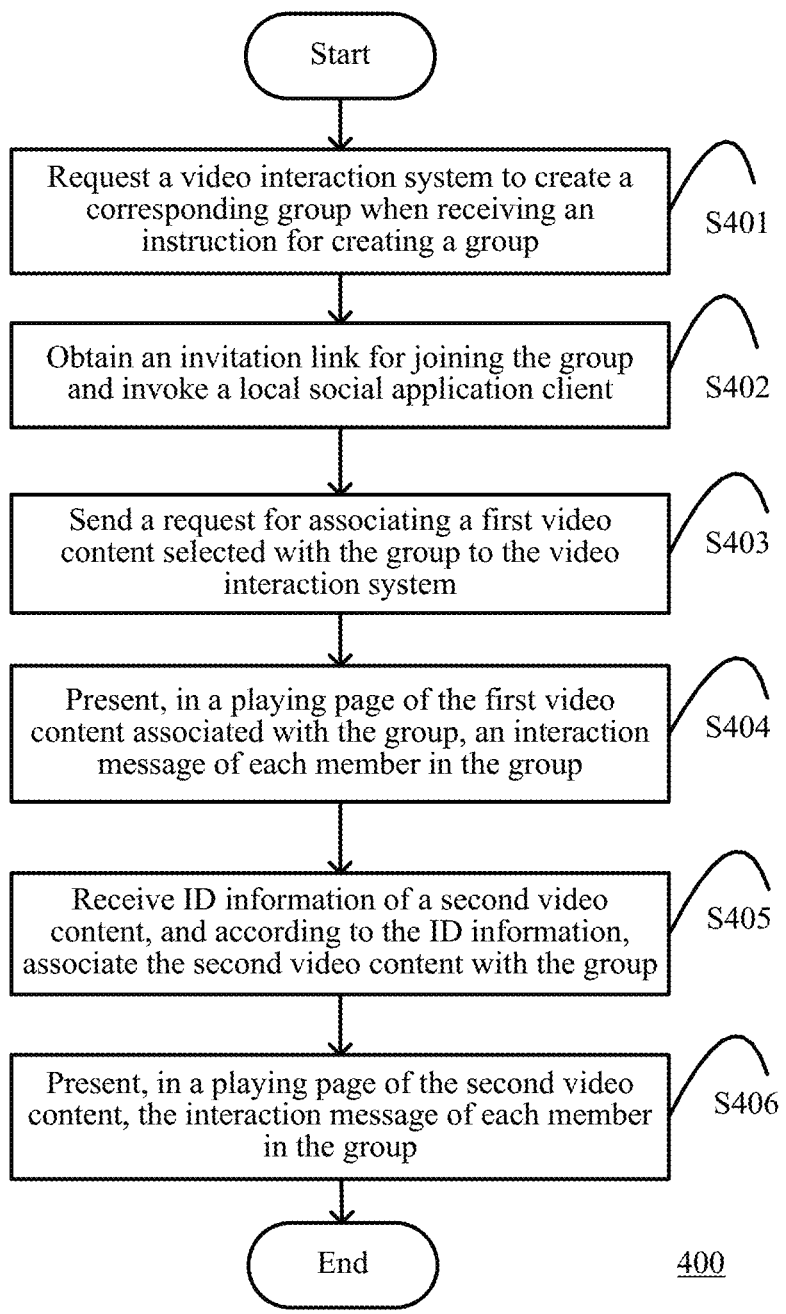
FIG. 4 is a flowchart of a method 400 for implementing message interaction in a video playing page according to some embodiments of this application.

FIG. 4 is a flowchart of a method 400 for implementing message interaction in a video playing page according to some embodiments of this application. The method 400, for example, may be performed by the video client (111), but this application is not limited thereto.

As shown in FIG. 4, the method 400 includes steps S401 to S404. The implementations of steps S401 to S404 are respectively consistent with those of steps S201 to S204, and will not be repeatedly described herein. In addition, not only a video client (a video client performing the method 400) sending a group creation request may request a video interaction system to associate the video content with the group (that is, the operation performed by step S403), but also the video clients (for example, the video client 121) of other members in the group may also request the video interaction system 130 to associate the group with a video content selected. On the basis of this, the video interaction system 130 notifies the video clients of each group member of such an association result. In step S405, receive ID information of a second video content sent by the video interaction system 130 after associating the group with the second video content, and according to the ID information, associate the second video content with the group in the local video client. The ID information is sent by the video interaction system 130 when associating the group with the second video content. It should be understood that, in addition to the video client that performs the method 400, the video clients of other members in the group may also perform an operation similar to step S405.

Regarding the associated second video content and group in step S405, the method 400 may further perform step S406. In step S406, present, in a playing page of the second video content associated with the group, the interaction message of each member in the group. The specific implementation of step S406 is similar to that of step S204 and will not be repeatedly described herein. Based on the above, the video client of each member in the group may bind the association relationship of the video content and the group. On the basis of this, the video client of each member in the group may play the same video content (that is, the video content associated with the group) and present, in the playing page of the video content, an interaction message of each member in the group.

In some embodiments, the video interaction system 130 may include a connection server, a communications server, and a video server. Herein, the connection server, the communications server, and the video server may be integrated in a server device or may also be deployed in a plurality of serer devices. In some embodiments, the connection server is, for example, a web server, and may establish an http session connection with a video client. The video server may provide a video content to a video client. The communications server may manage message interaction of a group and manage an association relationship between the group and the video content. The more specific manner for requesting the video interaction system 130 to create a group in step S401 is described as follows. First, send a group creation request to the connection server, so that the connection server, according to the creation request, instructs the communications server to create the group. The communications server may manage information relating to the group. In an embodiment, the information relating to the group includes a group information list, a user list, and a message list. The group information list includes a creation information record of the group, a binding relationship with the video content, and so on. The user list is used to record ID information (account number) of each member in the group. The message list is used to record historical messages of each member. In addition, a manner for a target user that receives an invitation link to send a joining request to the video interaction system, to join the group is to send, in response to an instruction for joining the group, a corresponding joining request to the connection server through the invitation link. Thus, the connection server may, according to the joining request, instruct the communications server to add the target user to the group. In addition, the specific operation of sending a request for associating a first video content with the group to the video interaction system 130 in step S403 is to send the request for associating the first video content selected with the group to the communications server. Thus, the communications server may associate the first video content with the group according to the request. On the basis of this, the communications server may send association information (for example, the association information includes an ID of the first video content) to the video clients of other members in the group. Thus, the video clients of other members may, according to the association information, present the play frame of the first video content and the interaction message of each member in the group in the same page. The specific implementation of the video clients of other members presenting the play frame and interaction messages in the same page according to a notification message is similar to steps S405 and S406 and will not be repeatedly described herein. In addition, in step S404, the first video content may be obtained from the video server, and the interaction messages in the group associated with the first video content may be obtained from the communications server. It should be understood that, the video interaction system 130 in this application is not limited to include the connection server, the video server, and the communications server. In fact, the video interaction system 130 may be implemented as more or less servers.

Figure 5A:
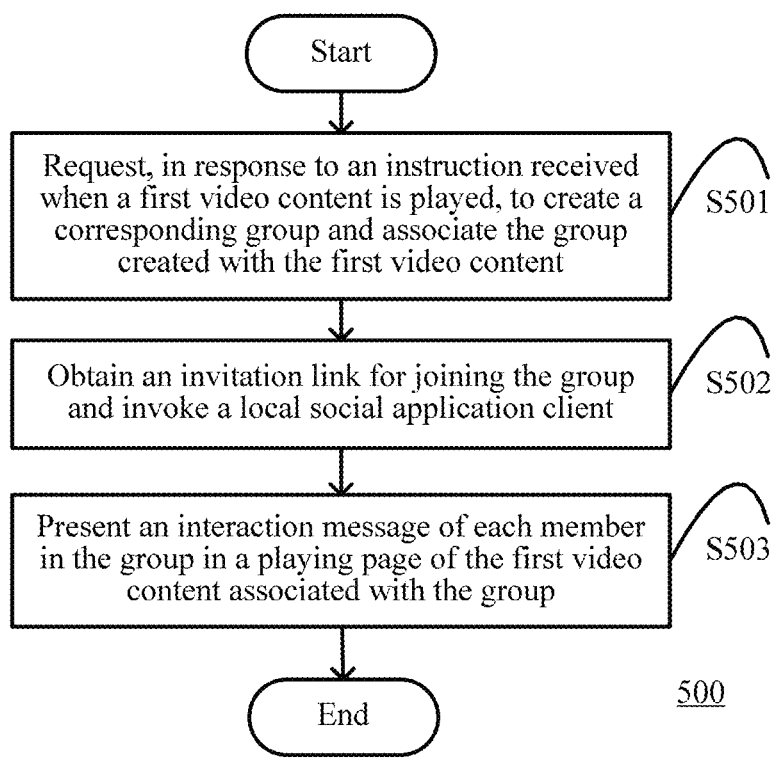
FIG. 5A is a flowchart of a method 500 for implementing message interaction in a video playing page according to some embodiments of this application.

FIG. 5A is a flowchart of a method 500 for implementing message interaction in a video playing page according to some embodiments of this application. The method 500, for example, may be performed by the video client (111), but this application is not limited thereto.

Figure 5B:
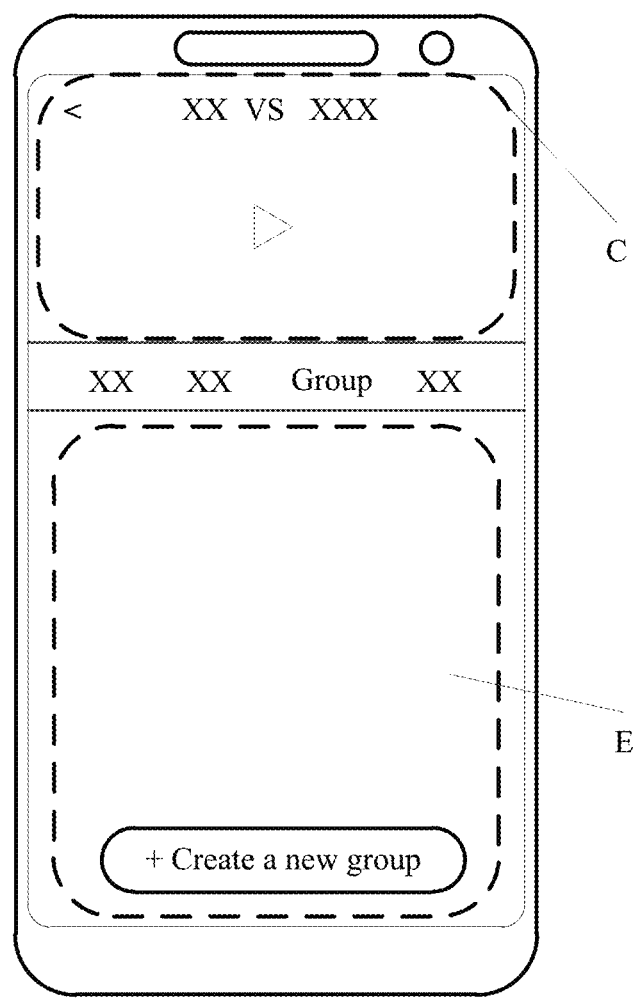
FIG. 5B is a schematic diagram of a page for playing a first video content according to an embodiment.

As shown in FIG. 5A, in step S501, request, in response to an instruction for creating a group by a first user of a computing device, which is received when a first video content is played, the video interaction system 130 to create a corresponding group and associate the group created with the first video content. In an embodiment, the page for playing the first video content is provided with a view object for creating a group. In response to a click operation of the view object, the video client requests the video interaction system 130 to create a corresponding group and associate the first video content with the group. FIG. 5B is a schematic diagram of a page for playing a first video content according to an embodiment. In FIG. 5B, a region C is a window for playing the first video content. When the "Group" in FIG. 5B is clicked, a region E is switched to the current page. The "+Create a new group" in the region E is a view object for creating a group as described above.

In step S502, obtain an invitation link for joining the group and invoke a local social application client to send the invitation link to a social application client of a target user selected by the first user. Thus, the social application client of the target user, when receiving the invitation link, in response to an instruction for joining the group, sends a corresponding joining request to the video interaction system 130 through the invitation link, so that the video interaction system 130 adds the target user to the group according to the joining request. In addition, the method 500 further includes step S503, that is, present an interaction message of each member in the group in the playing page of the first video content. The performing manner of step S503 is similar to that of step S404 and will not be repeatedly described herein. In view of the above, when a user watching a video content (typically, but is not limited to, watching a match), the method 500 may request the video interaction system 130 to establish a group associated with the video content that is being watched. On the basis of this, the video client of each member in the group may present, in the same page, the play frame of the video content and the interaction message of each member in the group, to avoid a troublesome operation of switching an interface between a video playing page and a social application client (WeChat or QQ client) frequently.

Figure 5C:
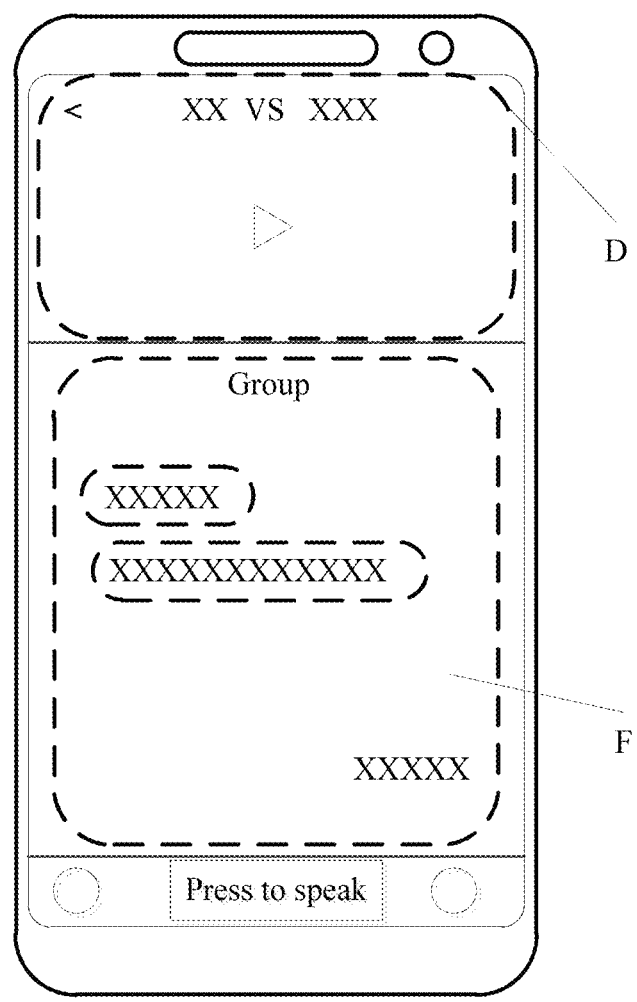
FIG. 5C is a schematic diagram of a chat page according to an embodiment.

It should be additionally noted that, in step S502, when the target user joins the group, the social application client of the target user may invoke and open the local video client. On the basis of this, when the chat window of the group in the video client is opened, the play frame of the first video content may be displayed in the chat page. In other words, the interaction message of each member in the group is displayed in the playing page of the first video content. Especially, the video client of each member in the group may automatically determine the associated video content when the chat page of the group is opened and a user does not need to search for the associated video content. FIG. 5C is a schematic diagram of a chat page according to an embodiment. In FIG. 5C, a region D is a play frame of a first video content. A region F is a chat window of the group.

Figure 6:
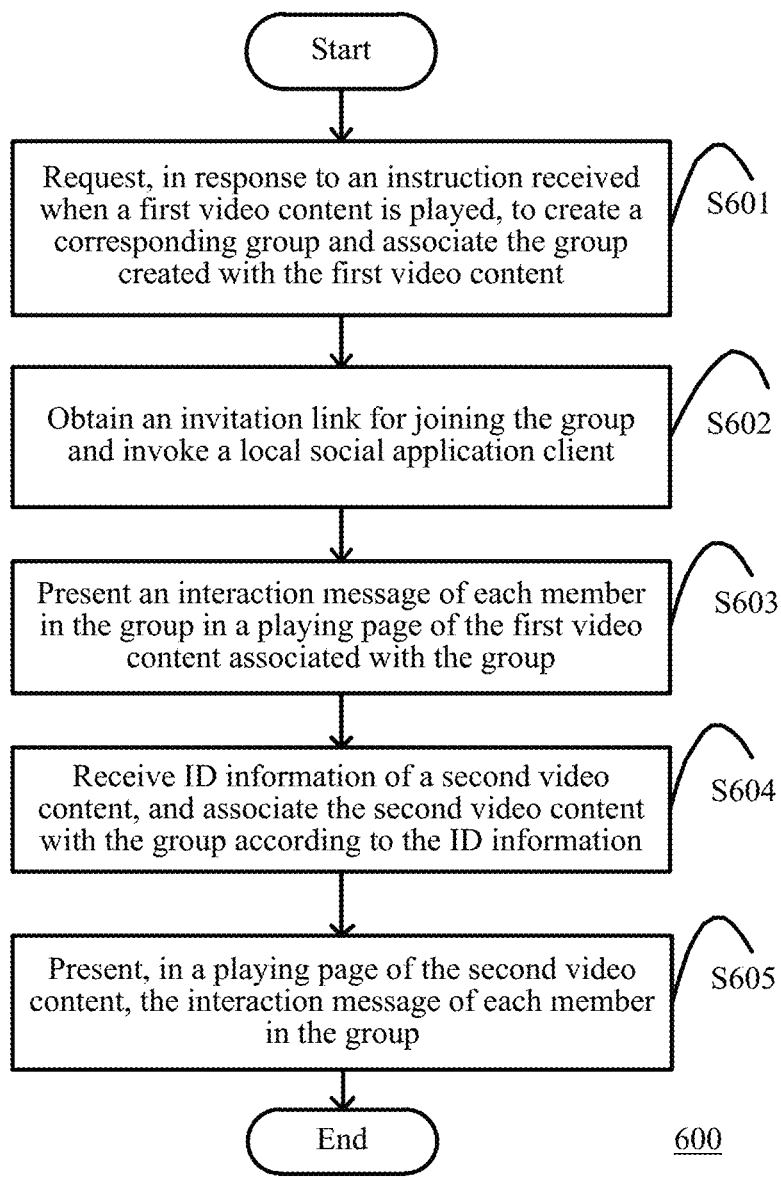
FIG. 6 is a flowchart of a method 600 for implementing message interaction in a video playing page according to some embodiments of this application.

FIG. 6 is a flowchart of a method 600 for implementing message interaction in a video playing page according to some embodiments of this application. The method 600, for example, may be performed by the video client (111), but this application is not limited thereto.

As shown in FIG. 6, the method 600 may include steps S601 to S603. The implementations of steps S601 to S603 are consistent with those of steps S501 to S503, and will not be repeatedly described herein.

It should be additionally noted that, the video content associated with the group may be determined not only by the video client of the user that creates the group but also by the video client of the target user joining the group. Specifically, the video client of the target user, in response to an instruction for associating a second video content with the group, requests the video interaction system 130 to associate the group with the second video content. On the basis of this, the method 600 may further perform step S604, i.e., receive ID information of the second video content sent by the video interaction system 130 when associating the group with the second video content, and associate the second video content with the group according to the ID information. The ID information is sent by the video interaction system 130 when associating the group with the second video content. In step S605, present, in a playing page of the second video content associated with the group, the interaction message of each member in the group. The implementation of step S605 is similar to that of step S603 and will not be repeatedly described herein.

Figure 7:
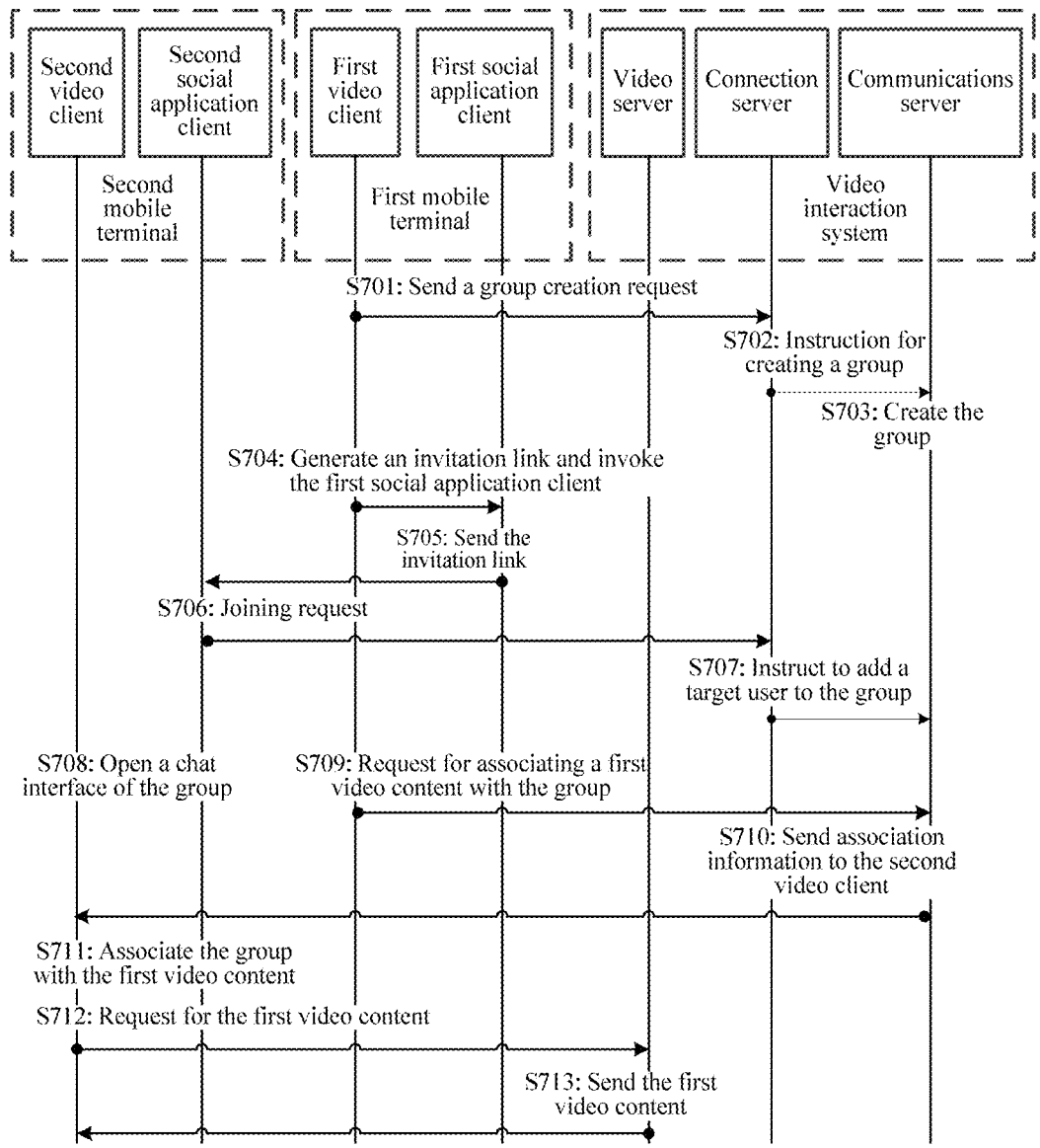
FIG. 7 is a message interaction diagram according to some embodiments of this application.

FIG. 7 is a message interaction diagram according to some embodiments of this application.

As shown in FIG. 7, when receiving the instruction for creating a group, the first video client may perform step S701, that is, send a group creation request to the connection server.

Subsequently, the connection server performs step S702, that is, instruct the communications server to create a group according to the creation request. Thus, the communications server may perform step S703, that is, create the group.

The first video client performs step S704 after performing step S701, that is, generate an invitation link for joining the group and invoke a first social application client.

Then, the first social application client may perform step S705, that is, send the invitation link to a social application client (for example, a second social application client) of a target user selected by the first user.

When receiving the invitation link, the second social application client may perform step S706, that is, in response to the instruction for joining the group, send a corresponding joining request to the connection server through the invitation link.

On the basis of this, the connection server may perform step S707, that is, instruct the communications server to add the user of the second social application client to the group. In addition, the connection server may return a confirmation message of having joined the group to the second social application. On the basis of this, the second social application client may invoke the second video client. After the second video client is started, step S708 may be performed to open a chat interface (window) of the group. Herein, when the chat interface is opened, a session connection will be established with the communications server, to receive the interaction message of each member in the group in real time. In addition, the first video client may perform step S709, that is, send a request for associating the first video content with the group to the communications server. Correspondingly, the communications server may perform step S710, that is, associate the first video content with the group, and send association information to the second video client. Herein, the association information, for example, may include an ID of the first video content. The second video client may perform step S711, that is, according to the ID of the first video content, associate the group with the first video content. Subsequently, the second video client may perform step S712, that is, request to obtain the first video content from the video server. The video server may perform step S713, that is, send the first video content to the second video client. Thus, the second video client may, in the same page, display the play frame of the first video content and present the interaction message of each member in the group. In addition, the first video client may also perform an operation similar to that in step S712.

Figure 8:
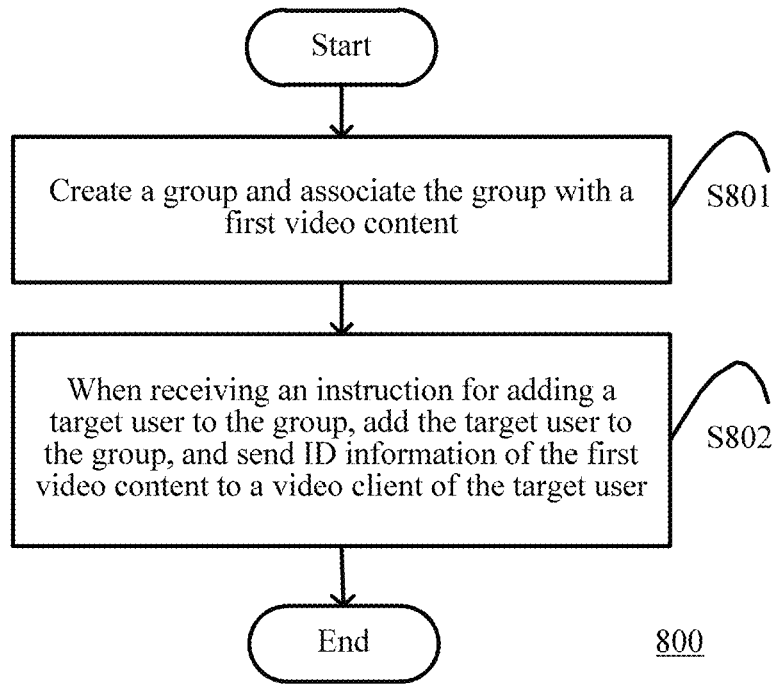
FIG. 8 is a flowchart of a method 800 for managing a group according to some embodiments of this application.

FIG. 8 is a flowchart of a method 800 for managing a group according to some embodiments of this application. The method 800, for example, may be performed by the communications server.

In step S801, create a corresponding group when receiving an instruction for creating a group and associating the group to be created with a first video content, and associate the group with the first video content.

In step S802, when receiving an instruction for adding a target user to the group, add the target user to the group, and send the ID information of the first video content associated with the group to the video client of the target user. Thus, the video client of the target user associates the group with the first video content according to the ID information.

Figure 9:
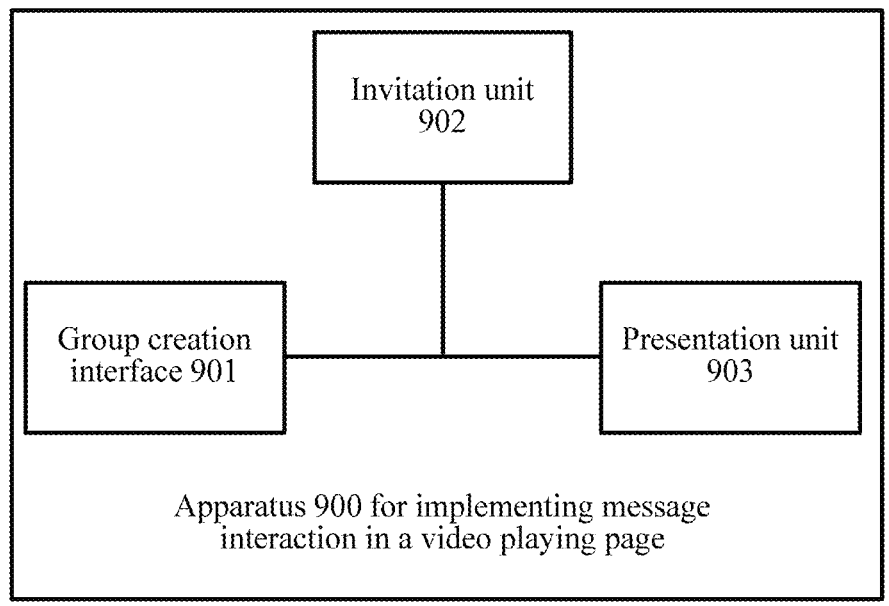
FIG. 9 is a schematic diagram of an apparatus 900 for implementing message interaction in a video playing page according to some embodiments of this application.

FIG. 9 is a schematic diagram of an apparatus 900 for implementing message interaction in a video playing page according to some embodiments of this application. The apparatus 900 may be run in a video client (such as 111 or 121). As shown in FIG. 9, the apparatus 900 includes a group creation interface 901, an invitation unit 902, and a presentation unit 903.

The group creation interface 901 may be configured to request a video interaction system to create a corresponding group when receiving an instruction for creating a group.

The invitation unit 902 may be configured to obtain the invitation link for joining the group and invoke a social application client to send the invitation link to the social application client of the target user selected by the first user. The social application client of the target user, when receiving the invitation link, in response to an instruction for joining the group, sends a corresponding joining request to the video interaction system 130 through the invitation link. Thus, the video interaction system adds the target user to the group according to the joining request. In addition, the group creation interface 901 may further be configured to send a request for associating a first video content selected and the group to the video interaction system, so that the video interaction system 130 associates the first video content with the group according to the request.

The presentation unit 903 may be configure to present, in a playing page of the first video content associated with the group, an interaction message of each member in the group. In an embodiment, the presentation unit 903 is configured to present a play frame of the first video content in a first region of the playing page and present the interaction message in a second region of the playing page. In another embodiment, the presentation unit 903 is configured to display the interaction message in a floating manner in a predetermined region of the play frame of the first video content. In another embodiment, the first video content is a live broadcast content. The presentation unit 903 is configured to present the interaction message and the play frame of the first video content in the playing image when the first video content is in a playing time period.

In another embodiment, the presentation unit 903 is configured to present an interaction message of each member in the group according to the following manner. First, the presentation unit 903 presents a chat window of the group. When receiving a first message input in the chat window by a first member in the group, the presentation unit 903 presents the first message in the chat window, associates the first message with the first member, and sends the first message and a first user ID corresponding to the first member to the video interaction system. Thus, the video interaction system sends the first message and the first user ID to video clients of other members in the group. When a second message and a second user ID of the group are received from the video interaction system, the presentation unit 903 presents the second message in the chat window and associates the second message with the member in the group corresponding to the second user ID. The more specific implementation of the apparatus 900 is consistent with that of the method 200, and will not be repeatedly described herein.

Figure 10:
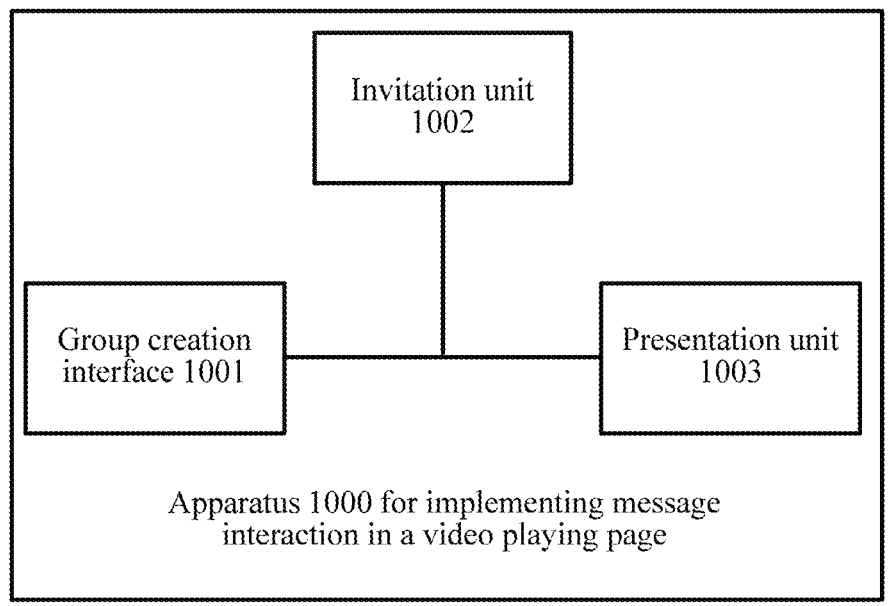
FIG. 10 is a schematic diagram of an apparatus 1000 for implementing message interaction in a video playing page according to some embodiments of this application.

FIG. 10 is a schematic diagram of an apparatus 1000 for implementing message interaction in a video playing page according to some embodiments of this application. The apparatus 1000 may be run in a video client. The apparatus 1000 includes a group creation interface 1001, an invitation unit 1002, and a presentation unit 1003.

The implementation of the invitation unit 1002 is consistent with that of the invitation unit 902, and will not be repeatedly described herein.

The group creation interface 1001 is not only configured to perform the same operation as that performed by the group creation interface 901, but also configured to associate, when receiving the ID information of the second video content sent by the video interaction system after associating the group with the second video content, the second video content with the group according to the ID information. The presentation unit 1003 may be not only configured to perform the same operation as that performed by the presentation unit 903, but also configured to present the interaction message of each member in the group in the playing page of the second video content associated with the group.

In an embodiment, the video interaction system includes a connection server, a communications server, and a video server. The group creation interface 1001 is configured to send a group creation request to the connection server, so that the connection server, according to the creation request, instructs the communications server to create the group. The group creation interface 1001 is configured to send a request for associating a first video content selected and the group to the communications server, so that the communications server associates the first video content with the group according to the request. The presentation unit 1003 is configured to obtain the first video content from the video server, and the interaction messages in the group associated with the first video content from the communications server. The more specific implementation of the apparatus 1000 is consistent with that of the method 400, and will not be repeatedly described herein.

Figure 11:
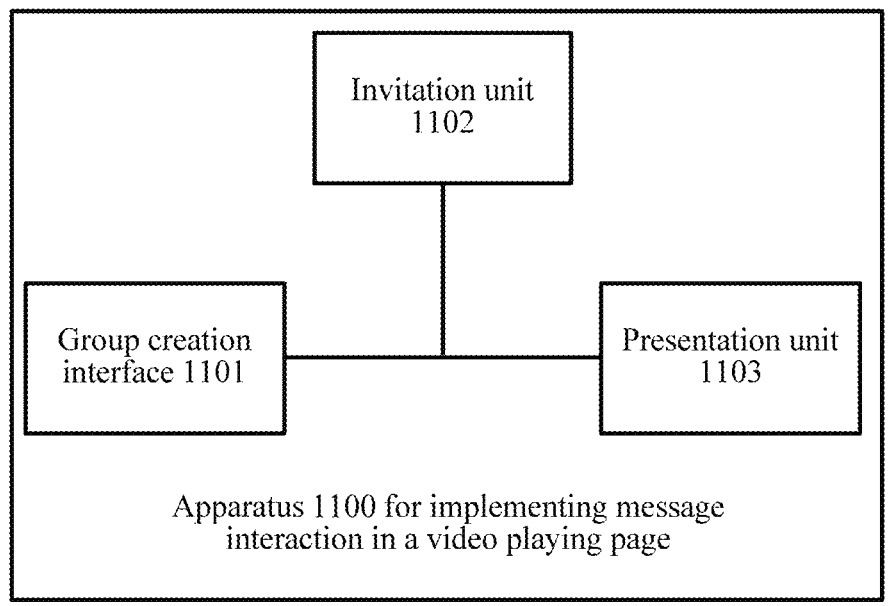
FIG. 11 is a schematic diagram of an apparatus 1100 for implementing message interaction in a video playing page according to some embodiments of this application.

FIG. 11 is a schematic diagram of an apparatus 1100 for implementing message interaction in a video playing page according to some embodiments of this application. The apparatus 1100 may be run in a video client. As shown in FIG. 11, the apparatus 1100 includes a group creation interface 1101, an invitation unit 1102, and a presentation unit 1103.

The group creation interface 1101 is configured to request, in response to an instruction for creating a group received when a first video content is played, a video interaction system to create a corresponding group and associate the group created with the first video content.

The invitation unit 1102 may be configured to obtain the invitation link for joining the group and invoke a social application client to send the invitation link to a social application client of a target user selected by the first user. On the basis of this, the social application client of the target user, when receiving the invitation link, in response to an instruction for joining the group, sends a corresponding joining request to the video interaction system through the invitation link, so that the video interaction system adds the target user to the group according to the joining request. The presentation unit 1103 is configured to present, in a playing page of the first video content, an interaction message of each member in the group. The more specific implementation of the apparatus 1100 is consistent with that of the method 500, and will not be repeatedly described herein.

Figure 12:
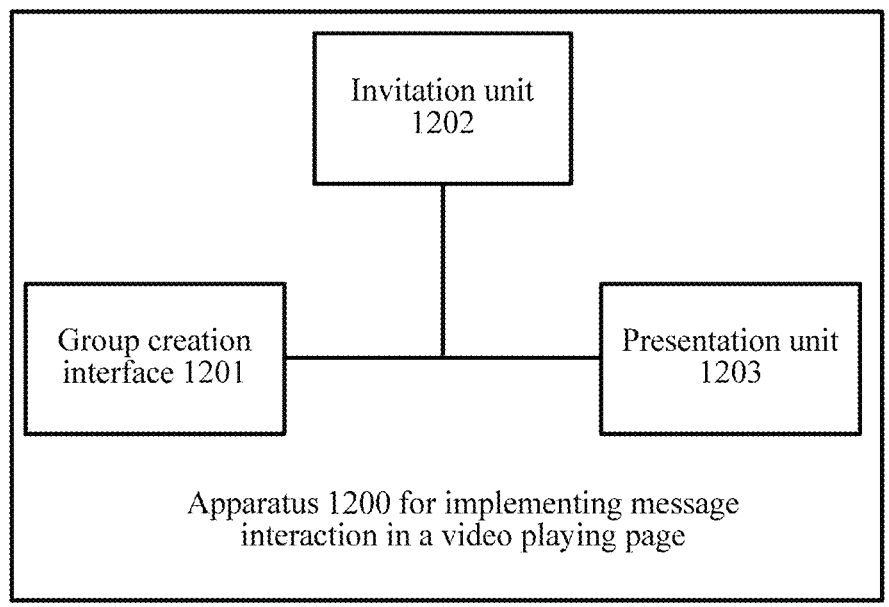
FIG. 12 is a schematic diagram of an apparatus 1200 for implementing message interaction in a video playing page according to some embodiments of this application.

FIG. 12 is a schematic diagram of an apparatus 1200 for implementing message interaction in a video playing page according to some embodiments of this application. The apparatus 1200 may be run in a video client. As shown in FIG. 12, the apparatus 1200 includes a group creation interface 1201, an invitation unit 1202, and a presentation unit 1203. It should be first noted that, the group creation interface 1201, the invitation unit 1202, and the presentation unit 1203 may respectively perform operations that are consistent with those performed by the group creation interface 1101, the invitation unit 1102, and the presentation unit 1103, which will not be repeatedly described herein. In an embodiment, the group creation interface 1201 is further configured to associate, when receiving ID information of a second video content sent by a video interaction system after associating the group with the second video content, the second video content with the group according to the ID information. The presentation unit 1203 is further configured to present, in a playing page of the second video content associated with the group, the interaction message of each member in the group. The more specific implementation of the apparatus 1200 is consistent with that of the method 600, and will not be repeatedly described herein.

Figure 13:
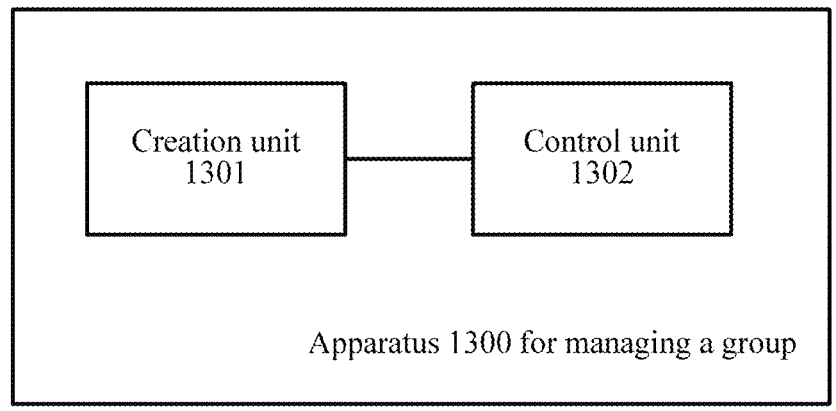
FIG. 13 is a schematic diagram of an apparatus 1300 for managing a group according to some embodiments of this application.

FIG. 13 is a schematic diagram of an apparatus 1300 for managing a group according to some embodiments of this application. The apparatus 1300 may be run in a communications server. As shown in FIG. 13, the apparatus 1300 includes a creation unit 1301 and a control unit 1302. The creation unit 1301 is configured to create a corresponding group when receiving an instruction for creating a group and associating the group to be created with a first video content, and associate the group with the first video content. The control unit 1302 is configured to add, when receiving an instruction for adding a target user to the group, the target user to the group, and send the ID information of the first video content associated with the group to a video client of the target user. Thus, the video client of the target user associates the group with the first video content according to the ID information.

Figure 14:
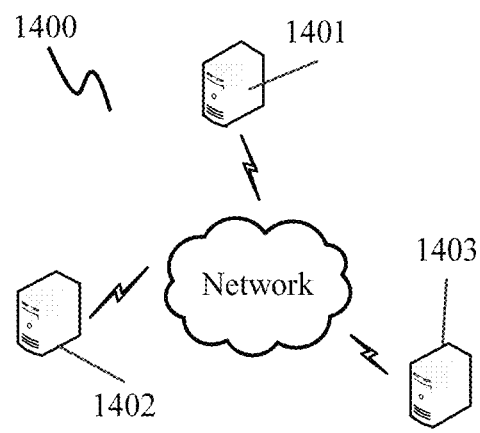
FIG. 14 is a schematic diagram of a video interaction system 1400 according to some embodiments of this application.

FIG. 14 is a schematic diagram of a video interaction system 1400 according to some embodiments of this application. The video interaction system 1400 may include a connection server 1401, a communications server 1402, and a video server 1403. The connection server 1401 is configured to instruct, when receiving a group creation request sent by a video client, the communications server to create a group according to the creation request. The connection server 1401 is further configured to receive a request for joining the group sent by a social application client and instruct the communications server 1402 to add a target user corresponding to the social application client sending the request to the group. The communications server 1402 is configured to provide an interaction message of each member in the group to the video client. In addition, when receiving a request for associating a first video content with the group from the video client, the communications server 1402 associates the first video content with the group according to the request. The video server 1403 is configured to provide the first video content to the video client.

Figure 15:
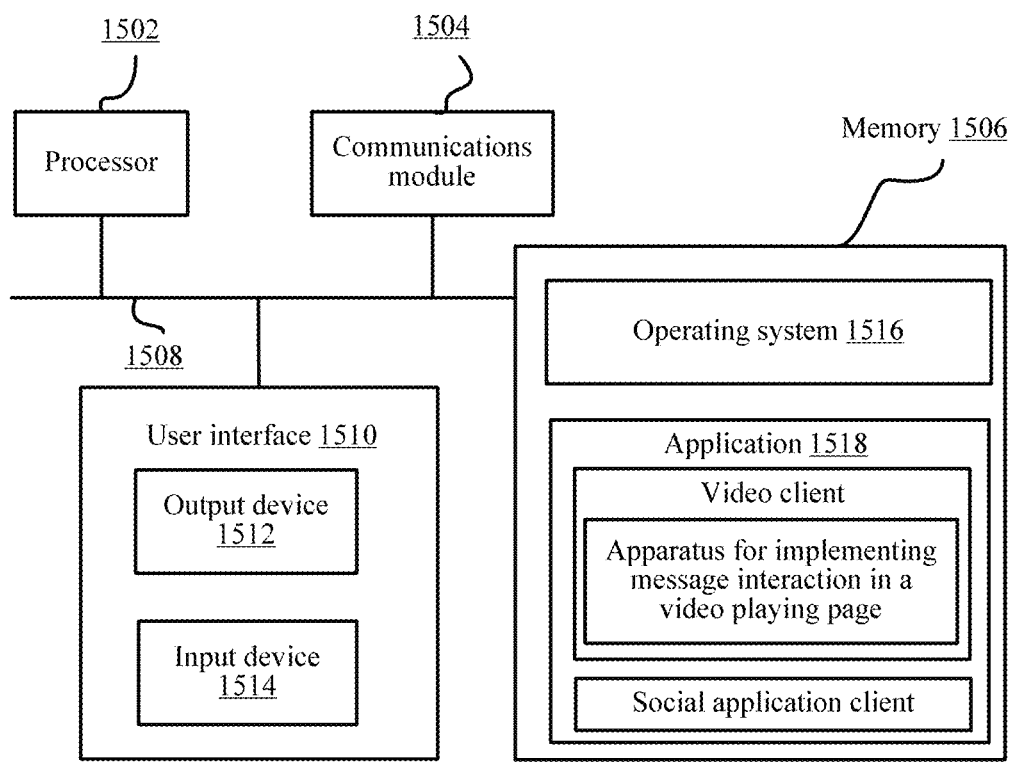
FIG. 15 is a schematic diagram of a computing device according to some embodiments of this application.

FIG. 15 is a structural diagram of composition of a computing device on which the foregoing entities are located. As shown in FIG. 15, the computing device includes one or more processors (CPU) 1502, a communications module 1504, a memory 1506, a user interface 1510, and a communications bus 1508 for interconnecting these components.

The processor 1502 may implement network communication and/or local communication by receiving and sending data through the communications module 1504.

The user interface 1510 includes one or more output devices 1512, including one or more speakers and/or one or more visualization displays. The user interface 1510 further includes one or more input devices 1514, including a keyboard, a mouse, a sound command input unit or a microphone, a touch display, a touch-sensitive input panel, a posture capturing camera, another input key or control, or the like.

The memory 1506 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 1506 stores an instruction set that can be executed by the processor 1502 and includes:

an operating system 1516, including a program used for processing various basic system services and for executing hardware-related tasks; and an application 1518, including various programs for implementing the method for implementing message interaction in a video playing page, where the programs may implement the processing procedure in each embodiment, for example, the application 1518 may include the video client and the social application client in this application. The video client may include the apparatus 900 for implementing message interaction in a video playing page shown in FIG. 9, the apparatus 1000 in FIG. 10, the apparatus 1100 in FIG. 11, and the apparatus 1200 in FIG. 12.

In addition, each embodiment of this application may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of the data processing device for execution. Therefore, such a storage medium also constitutes this application. The storage medium may use any type of recording manner, for example, a paper storage medium (such as paper tape), a magnetic storage medium (such as a floppy disk, a hard disk, and a flash memory), an optical storage medium (such as CD-ROM), and a magneto-optical storage medium (such as MO).

Therefore, this application further provides a non-volatile storage medium, which stores a data processing program. The data processing program is used for executing any embodiment of the foregoing method of this application.

In addition, the steps of the method of this application may be implemented not only by the data processing program, but also by hardware, such as a logic gate, a switch, an Application Specific Integrated Circuit (ASIC), a programmable logic controller, and an embedded microcontroller. Therefore, the hardware that may implement the method of this application may also constitute this application.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A method for implementing message interaction in a video playing page, performed by a computing device having one or more processors and memory storing programs to be executed by the one or more processors, the method comprising:

receiving an instruction for creating a group by a first user of the computing device;

in response to the user instruction, submitting a request to a video interaction system to create a corresponding group;

obtaining an invitation link for joining the group and invoking a social application client to send the invitation link to a social application client of a target user selected by the first user among direct contacts of the first user at the social application, wherein the social application client of the target user sends, when receiving the invitation link, in response to an instruction for joining the group, a corresponding joining request to the video interaction system through the invitation link and the video interaction system adds the target user to the group according to the joining request;

sending a request for associating a first video content selected by the first user for the group to the video interaction system, wherein the video interaction system associates the first video content with the group according to the request, the first video content comprises content live broadcast by a source outside the group; and presenting, within a playing page of the first video content associated with the group, an interaction message of each member in the group, and the interaction message is displayed in a floating manner, overlaid in a predetermined region of a frame of the first video content wherein the video interaction system comprises a connection server and a communications server that are deployed in a plurality of server devices;

the requesting the video interaction system to create a corresponding group comprises:

sending a group creation request to the connection server, so that the connection server instructs, according to the creation request, the communications server to create the group.

2. The method according to claim 1, further comprising:
receiving ID information of a second video content sent by the video interaction system and associating the second video content with the group according to the ID information, wherein the ID information is sent by the video interaction system when associating the group with the second video content; and presenting, in a playing page of the second video content associated with the group, the interaction message of each member in the group.

3. The method according to claim 1, wherein the presenting, in a playing page of the first video content associated with the group, an interaction message of each member in the group comprises:

presenting a play frame of the first video content in a first region of the playing page and presenting the interaction message in a second region of the playing page.

4. The method according to claim 1, wherein the presenting, in a playing page of the first video content associated with the group, an interaction message of each member in the group comprises:

displaying the interaction message in a floating manner in a predetermined region of a play frame of the first video content.

5. The method according to claim 1, wherein the presenting, in a playing page of the first video content associated with the group, an interaction message of each member in the group comprises:

presenting the interaction message and a play frame of the first video content in the playing image when the first video content is in a playing time period.

6. The method according to claim 1, wherein the presenting, in a playing page of the first video content associated with the group, an interaction message of each member in the group comprises:

presenting a chat window of the group;

presenting, when receiving a first message input in the chat window by a first member in the group, the first message in the chat window, associating the first message with the first member, and sending the first message and a first user ID corresponding to the first member to the video interaction system, so that the video interaction system sends the first message and the first user ID to video clients of other members in the group; and presenting, when receiving a second message and a second user ID of the group from the video interaction system, the second message in the chat window, and associating the second message with a member in the group corresponding to the second user ID.

7. The method according to claim 1, wherein the sending a request for associating a first video content selected with the group to the video interaction system, so that the video interaction system associates the first video content with the group according to the request comprises:

sending a request for associating the first video content selected with the group to the communications server, so that the communications server associates the first video content with the group according to the request.

8. The method according to claim 7, wherein the video interaction system further comprises a video server, and the presenting, in a playing page of the first video content associated with the group, an interaction message of each member in the group comprises:

obtaining the first video content from the video server, and obtaining, from the communications server, the interaction message of each member in the group associated with the first video content.

9. A computing device comprising one or more processors, memory coupled to the one or more processors and a plurality of programs stored in the memory that, when executed by the one or more processors, cause the computing device to perform a plurality of operations comprising:

receiving an instruction for creating a group by a first user of the computing device;

in response to the user instruction, submitting a request to a video interaction system to create a corresponding group;

obtaining an invitation link for joining the group and invoking a social application client to send the invitation link to a social application client of a target user selected by the first user among direct contacts of the first user at the social application, wherein the social application client of the target user sends, when receiving the invitation link, in response to an instruction for joining the group, a corresponding joining request to the video interaction system through the invitation link and the video interaction system adds the target user to the group according to the joining request;

sending a request for associating a first video content selected by the first user for the group to the video interaction system, wherein the video interaction system associates the first video content with the group according to the request, the first video content comprises content live broadcast by a source outside the group; and presenting, within a playing page of the first video content associated with the group, an interaction message of each member in the group, and the interaction message is displayed in a floating manner, overlaid in a predetermined region of a frame of the first video content wherein the video interaction system comprises a connection server and a communications server that are deployed in a plurality of server devices;

the requesting the video interaction system to create a corresponding group comprises:

sending a group creation request to the connection server, so that the connection server instructs, according to the creation request, the communications server to create the group.

10. The computing device according to claim 9, wherein the plurality of operations further comprise:

receiving ID information of a second video content sent by the video interaction system and associating the second video content with the group according to the ID information, wherein the ID information is sent by the video interaction system when associating the group with the second video content; and presenting, in a playing page of the second video content associated with the group, the interaction message of each member in the group.

11. The computing device according to claim 9, wherein the presenting, in a playing page of the first video content associated with the group, an interaction message of each member in the group comprises:

presenting a play frame of the first video content in a first region of the playing page and presenting the interaction message in a second region of the playing page.

12. The computing device according to claim 9, wherein the presenting, in a playing page of the first video content associated with the group, an interaction message of each member in the group comprises:

displaying the interaction message in a floating manner in a predetermined region of a play frame of the first video content.

13. The computing device according to claim 9, wherein the presenting, in a playing page of the first video content associated with the group, an interaction message of each member in the group comprises:

presenting the interaction message and a play frame of the first video content in the playing image when the first video content is in a playing time period.

14. The computing device according to claim 9, wherein the presenting, in a playing page of the first video content associated with the group, an interaction message of each member in the group comprises:

presenting a chat window of the group;

presenting, when receiving a first message input in the chat window by a first member in the group, the first message in the chat window, associating the first message with the first member, and sending the first message and a first user ID corresponding to the first member to the video interaction system, so that the video interaction system sends the first message and the first user ID to video clients of other members in the group; and presenting, when receiving a second message and a second user ID of the group from the video interaction system, the second message in the chat window, and associating the second message with a member in the group corresponding to the second user ID.

15. The computing device according to claim 9, wherein the sending a request for associating a first video content selected with the group to the video interaction system, so that the video interaction system associates the first video content with the group according to the request comprises:

sending a request for associating the first video content selected with the group to the communications server, so that the communications server associates the first video content with the group according to the request.

16. The computing device according to claim 15, wherein the video interaction system further comprises a video server, and the presenting, in a playing page of the first video content associated with the group, an interaction message of each member in the group comprises:

obtaining the first video content from the video server, and obtaining, from the communications server, the interaction message of each member in the group associated with the first video content.

17. A non-transitory computer readable storage medium storing a plurality of machine readable instructions in connection with a first terminal having one or more processors, wherein the plurality of machine readable instructions, when executed by the one or more processors, cause the first terminal to perform a plurality of operations including:

receiving an instruction for creating a group by a first user of the computing device;

in response to the user instruction, submitting a request to a video interaction system to create a corresponding group;

obtaining an invitation link for joining the group and invoking a social application client to send the invitation link to a social application client of a target user selected by the first user among direct contacts of the first user at the social application, wherein the social application client of the target user sends, when receiving the invitation link, in response to an instruction for joining the group, a corresponding joining request to the video interaction system through the invitation link and the video interaction system adds the target user to the group according to the joining request;

sending a request for associating a first video content selected by the first user for the group to the video interaction system, wherein the video interaction system associates the first video content with the group according to the request, the first video content comprises content live broadcast by a source outside the group; and presenting, within a playing page of the first video content associated with the group, an interaction message of each member in the group, and the interaction message is displayed in a floating manner, overlaid in a predetermined region of a frame of the first video content wherein the video interaction system comprises a connection server and a communications server that are deployed in a plurality of server devices;

the requesting the video interaction system to create a corresponding group comprises:

sending a group creation request to the connection server, so that the connection server instructs, according to the creation request, the communications server to create the group.

18. The non-transitory computer readable storage medium according to claim 17, wherein the plurality of operations further comprise:

receiving ID information of a second video content sent by the video interaction system and associating the second video content with the group according to the ID information, wherein the ID information is sent by the video interaction system when associating the group with the second video content; and presenting, in a playing page of the second video content associated with the group, the interaction message of each member in the group.

* * * * *